(12) United States Patent
Coffey et al.

(10) Patent No.: US 10,156,190 B2
(45) Date of Patent: Dec. 18, 2018

(54) GAS TURBINE ENGINE UNCONTROLLED HIGH THRUST ACCOMMODATION SYSTEM AND METHOD

(71) Applicant: HONEYWELL INTERNATIONAL INC., Morristown, NJ (US)

(72) Inventors: Scot Coffey, Mesa, AZ (US); Gregory J. Chapman, Scottsdale, AZ (US); Yufei Xiong, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 550 days.

(21) Appl. No.: 14/717,506

(22) Filed: May 20, 2015

(65) Prior Publication Data
US 2016/0341066 A1 Nov. 24, 2016

(51) Int. Cl.
*F02C 9/20* (2006.01)
*F02C 9/18* (2006.01)
(Continued)

(52) U.S. Cl.
CPC .............. *F02C 9/20* (2013.01); *F02C 9/18* (2013.01); *F02C 9/22* (2013.01); *F02C 9/263* (2013.01); *F23N 3/06* (2013.01); *F23N 5/242* (2013.01); *F05B 2270/101* (2013.01); *F05B 2270/107* (2013.01); *F05B 2270/1011* (2013.01); *F05D 2270/02* (2013.01); *F05D 2270/051* (2013.01);
(Continued)

(58) Field of Classification Search
CPC ...... F02C 9/18; F02C 9/48; F02C 9/50; F02C 9/52; F02C 9/54; F02C 9/20; F02C 9/22; F05D 2270/09; F05D 2270/02; F05D 2270/051; F05D 2270/304; F05B 2270/101; F05B 2270/1011; F05B 2270/107; F05B 2270/1071
See application file for complete search history.

(56) References Cited

U.S. PATENT DOCUMENTS

| 2,941,354 A | 6/1960 | Sobey |
| 3,488,946 A | 1/1970 | Jubb et al. |

(Continued)

FOREIGN PATENT DOCUMENTS

EP 0342970 A2 11/1989

OTHER PUBLICATIONS

Extended EP Search Report for Application No. 16168454.3-1602 dated Oct. 28, 2016.
(Continued)

*Primary Examiner* — Ehud Gartenberg
*Assistant Examiner* — James McGlynn
(74) *Attorney, Agent, or Firm* — Lorenz & Kopf, LLP

(57) ABSTRACT

A system and method of accommodating an uncontrolled high thrust condition in a turbofan gas turbine engine includes processing engine data from the turbofan gas turbine engine to determine when a potential for an uncontrolled high thrust condition exists. When the potential for an uncontrolled high thrust condition exists, the engine data are processed to determine whether corrective action for the uncontrolled high thrust condition should be implemented by varying turbofan gas turbine engine effective geometry to (i) increase turbofan gas turbine engine rotational speed or (ii) decrease turbofan gas turbine engine rotational speed. The determined corrective action is automatically implemented.

11 Claims, 2 Drawing Sheets

(51) Int. Cl.
*F02C 9/22* (2006.01)
*F23N 3/06* (2006.01)
*F23N 5/24* (2006.01)
*F02C 9/26* (2006.01)

(52) U.S. Cl.
CPC .... *F05D 2270/09* (2013.01); *F05D 2270/304* (2013.01)

(56) References Cited

U.S. PATENT DOCUMENTS

| | | | |
|---|---|---|---|
| 3,641,766 | A | 2/1972 | Uehling |
| 4,112,677 | A | 9/1978 | Kasmarik |
| 4,483,147 | A | 11/1984 | Evans et al. |
| 4,523,517 | A | 6/1985 | Cronin |
| 4,653,267 | A | 3/1987 | Brodell et al. |
| 4,756,152 | A | 7/1988 | Krukoski et al. |
| 4,991,389 | A | 2/1991 | Schafer |
| 5,168,447 | A | 12/1992 | Moore |
| 5,313,778 | A | 5/1994 | Sweet et al. |
| 6,141,951 | A | 11/2000 | Krukoski et al. |
| 6,155,212 | A * | 12/2000 | McAlister ............... F02B 43/08 123/25 B |
| 6,655,126 | B2 * | 12/2003 | Walker ................. F02C 9/28 60/243 |
| 7,424,360 | B1 * | 9/2008 | Munson, Jr. ............. F02C 9/18 340/439 |
| 8,146,370 | B2 * | 4/2012 | Zeiner ................. F02C 3/10 60/778 |
| 8,302,405 | B2 | 11/2012 | Price et al. |
| 8,370,100 | B2 * | 2/2013 | Block ................. F01K 23/16 702/113 |
| 8,661,832 | B2 | 3/2014 | Griffin et al. |
| 9,689,316 | B1 * | 6/2017 | Crom ................. F02C 9/22 |
| 2005/0144957 | A1 * | 7/2005 | Ackerman ............. F01D 25/02 60/773 |
| 2010/0010720 | A1 | 1/2010 | Van Vactor et al. |
| 2011/0173988 | A1 | 7/2011 | Sweet et al. |

OTHER PUBLICATIONS

Yuhas, A.J. et al.; Effects of Bleed Air Extraction on Thrust Levels of the F404-GE-400 Turbofan Engine; NASA Technical Memorandum 104247 1992.

* cited by examiner

GAS TURBINE ENGINE UNCONTROLLED HIGH THRUST ACCOMMODATION SYSTEM AND METHOD

TECHNICAL FIELD

The present invention generally relates to gas turbine engine controls, and more particularly relates to a system and method for accommodating an uncontrolled high thrust condition in gas turbine engines.

BACKGROUND

Although highly unlikely, it is postulated that single or multiple component failures can result in an uncontrolled high thrust condition. Such a condition may include the actual engine thrust increasing to significantly higher levels than what is being commanded and/or remaining high when low thrust is commanded. For example, though highly unlikely, it is postulated that if the means of metering fuel to the engine (e.g., the fuel metering valve) were to fail in a fixed position, then the pilot may lose the ability to control engine thrust via the thrust/power/throttle levers or the auto-throttle. If the fuel metering means were to fail at the maximum fuel flow position, then engine thrust will continue to increase until either an engine limit is reached or the pilot initiates an intervening action. The engine limit may be, for example, an engine control limit, such as an overspeed governor, or an inherent limit, such as an engine stall. Intervening actions may include, for example, recovering the normal fuel metering means or manually shutting down the affected engine.

Presently, most regulatory bodies address the postulated uncontrolled high thrust condition by relying on crew intervention. That is, it is presently asserted that a flight crew will readily recognize the condition and manually shutdown the affected engine. Engineering studies and service experience indicate that this assertion is not always valid. Moreover, as may be appreciated, even if a flight crew were to recognize the postulated uncontrolled high thrust condition and thus shut down the affected engine, that engine is now unavailable to provide electrical, hydraulic, and/or pneumatic power to the aircraft.

Hence, there is a need for a system and method for accommodating an uncontrolled high thrust condition in turbofan gas turbine engines that does not rely on flight crew recognition and subsequent intervention. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of accommodating an uncontrolled high thrust condition in a turbofan gas turbine engine includes processing engine data from the turbofan gas turbine engine to determine when a potential for an uncontrolled high thrust condition exists. When the potential for an uncontrolled high thrust condition exists, the engine data are processed to determine whether corrective action for the uncontrolled high thrust condition should be implemented by varying turbofan gas turbine engine effective geometry to (i) increase turbofan gas turbine engine rotational speed or (ii) decrease turbofan gas turbine engine rotational speed. The determined corrective action is automatically implemented.

In another embodiment, a turbofan gas turbine engine uncontrolled high thrust condition accommodation system includes an engine data source and an engine control. The engine data source is configured to supply engine data representative of turbofan gas turbine engine operability. The engine control is coupled to receive the engine data and is configured, upon receipt thereof, to determine when a potential for an uncontrolled high thrust condition exists in the turbofan gas turbine engine. Upon determining that the potential for an uncontrolled high thrust condition exists, the engine control is further configured to determine whether corrective action for the uncontrolled high thrust condition should be implemented by varying turbofan gas turbine engine effective geometry to (i) increase turbofan gas turbine engine rotational speed or (ii) decrease turbofan gas turbine engine rotational speed, and supply commands that cause the determined corrective action to be implemented.

In yet another embodiment, a turbofan gas turbine engine control system includes a turbofan gas turbine engine, a plurality of bleed air flow control valves, an engine data source, and an engine control. The turbofan gas turbine engine has a plurality of movable inlet guide vanes mounted therein that are responsive to guide vane position commands to move to commanded guide vane positions. The bleed air flow control valves are in fluid communication with the turbofan gas turbine engine. Each bleed air flow control valve is responsive to valve position commands to control bleed air flow from the turbofan gas turbine engine. The engine data source is coupled to the turbofan gas turbine engine and is configured to supply engine data representative of turbofan gas turbine engine operability. The engine control is coupled to receive the engine data and is configured, upon receipt thereof, to determine when a potential for an uncontrolled high thrust condition exists in the turbofan gas turbine engine. Upon determining that the potential for an uncontrolled high thrust condition exists, the engine control is configured to determine whether corrective action for the uncontrolled high thrust condition should be implemented by (i) supplying guide vane position commands that cause the inlet guide vanes to close to thereby increase turbofan gas turbine engine rotational speed or (ii) supply valve position commands that cause bleed air flow from the turbofan gas turbine engine to increase to thereby decrease turbofan gas turbine engine rotational speed, and supply the commands that cause the determined corrective action to be implemented.

Furthermore, other desirable features and characteristics of the uncontrolled high thrust accommodation system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although embodiments described herein are directed toward a turbofan gas turbine engine, it will be appreciated that the described embodiments could be implemented in other types of gas turbine engines.

Figure 1:
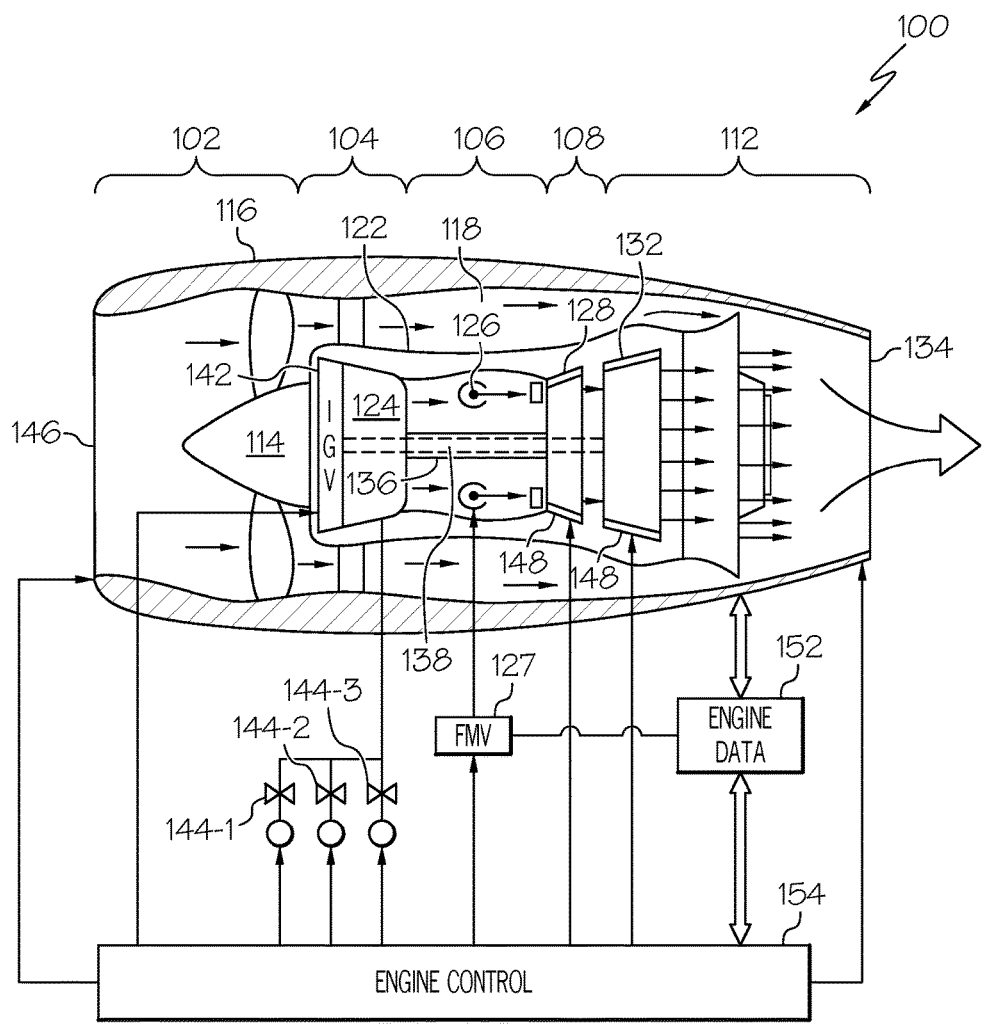
FIG. 1 depicts a functional block diagram of an exemplary gas turbine engine control system.

Turning now to FIG. 1, a functional block diagram of an exemplary gas turbine engine control system is depicted. The depicted system is for a multi-spool turbofan gas turbine engine 100, which includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel that is controllably supplied to the combustor assembly 126 from a non-illustrated fuel source via a fuel metering valve 127. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through a exhaust nozzle 134 disposed in the exhaust section 112, providing additional forward thrust. As the turbines 128 and 132 rotate, each drives equipment in the engine 100 via concentrically disposed shafts or spools. Specifically, the high pressure turbine 128 drives the compressor 124 via a high pressure spool 136, and the low pressure turbine 132 drives the fan 114 via a low pressure spool 138.

The depicted engine 100 additionally includes a plurality of variable geometry devices. The variable geometry devices, which may be variously configured and implemented, impact the effective geometry of the engine 100 and, for a given fuel flow, can be positioned to either increase or decrease engine speed. Some non-limiting examples of the variable geometry devices include one or more of a plurality of variable inlet guide vanes 142, a plurality of bleed air flow control valves 144, a variable area engine inlet 146, one or more sets of variable turbine stator vanes 148, and a variable area exhaust nozzle 134. Each of these variable geometry devices, and the impact each has on engine speed, will now be briefly described.

The variable inlet guide vanes 142, when included, are responsive to guide vane position commands to move to commanded guide vane positions. As is generally known, for given engine conditions, closing the variable inlet guide vanes 142 will cause the rotational speed of the engine 100 to increase, and opening the variable inlet guide vanes 142 will cause the rotational speed of the engine 100 to decrease.

The bleed air flow control valves 144 are in fluid communication with the turbofan gas turbine engine 100. More specifically, the bleed air flow control valves 144 are in fluid communication with the compressor section 104 of the engine, via, for example, one or more bleed air supply lines (only one depicted). Each bleed air flow control valve 144 is responsive to valve position commands to control bleed air flow from the turbofan gas turbine engine 100. It will be appreciated that the number of bleed air flow control valves 144 may vary depending, for example, on the number of bleed air loads that may be supplied with bleed air. In the depicted embodiment, the bleed air flow control valves 144 include one or more surge bleed control valves 144-1 (only one depicted), one or more aircraft bleed air system control valves 144-2 (only one depicted), and one or more anti-ice system control valves 144-3 (only one depicted). Regardless of the number of bleed air flow control valves 144 and associated loads, it is generally known that, for given engine conditions, reducing bleed air flow from the engine 100 will cause the rotational speed of the engine 100 to increase, and increasing bleed air flow from the engine 100 will cause the rotational speed of the engine 100 to decrease.

The variable area engine inlet 146, when included, is responsive to engine inlet position commands to move to commanded engine inlet position. As is generally known, for given engine conditions, increasing the area of the engine inlet 146 will cause the rotational speed of the engine 100 to increase, and decreasing the area of the engine inlet 146 will cause the rotational speed of the engine 100 to decrease.

The variable turbine stator vanes 148 may be included in the high pressure turbine 128, or the low pressure turbine 132, or both. For clarity, the depicted engine 100 is shown as including variable turbine stator vanes 148 in both turbines. Regardless of whether the variable turbine stator vanes 148 are included in only one or in both turbines 128, 132, the variable turbine stator vanes 148, when included, are responsive to turbine stator vane position commands to move to commanded turbine stator vane positions. As is generally known, for given engine conditions, closing the variable turbine stator vanes 148 in a high pressure 128 will cause the rotational speed of the engine 100 to increase, and opening the variable turbine stator vanes 148 in a high pressure 128 will cause the rotational speed of the engine 100 to decrease. Conversely, for given engine conditions, opening the variable turbine stator vanes 148 in a low pressure 132 will cause the rotational speed of the engine 100 to increase, and closing the variable turbine stator vanes 148 in a low pressure 132 will cause the rotational speed of the engine 100 to decrease The variable area exhaust nozzle 134, when included, is responsive to exhaust nozzle position commands to move to commanded exhaust nozzle position. As is generally known, for given engine conditions, increasing the area of the exhaust nozzle 134 will cause the rotational speed of the engine 100 to increase, and decreasing the area of the exhaust nozzle 134 will cause the rotational speed of the engine 100 to decrease.

As FIG. 1 further depicts, the system additionally includes an engine data source 152 and an engine control 154. The engine data source 152 is coupled to the turbofan gas turbine engine 100 and is configured to supply engine data representative of turbofan gas turbine engine operability. The engine data source 152 may be variously configured and implemented, but in the depicted embodiment the engine data source 152 is implemented using various sensors that are configured to supply data representative of various parameters associated with turbofan gas turbine engine operability. The parameters may also vary, but include at least fuel flow, fuel metering valve data, engine rotational speeds (both N1 and N2), and various engine temperatures and pressures, just to name a few.

No matter how the engine data source 152 is specifically implemented, the engine control 154 is coupled to receive the engine data supplied from the engine data source 152. The engine control 154 is configured, upon receipt of the engine data, to control the operation of the turbofan gas turbine engine 100. The engine control 154 is additionally configured, upon receipt of the engine data, to determine when a potential for an uncontrolled high thrust condition exists in the turbofan gas turbine engine 100. The manner in which the engine control 148 determines that a potential for an uncontrolled high thrust condition exists may vary. In one particular embodiment, it makes this determination based on fuel metering valve operability—that is, whether the fuel metering valve 127 is stuck in a position that will result in an uncontrolled high thrust condition. It will be appreciated that this is only one technique for determining the potential for an uncontrolled high thrust condition. Other techniques include, for example, various electrical, hydraulic, mechanical, or pneumatic failures that would yield an increase in fuel flow sufficient to cause an uncontrolled thrust condition.

Regardless of how the potential for an uncontrolled high thrust condition is determined, the engine control 154, upon making this determination, is further configured to determine the type of corrective action that should be implemented, and then supply the commands that cause the determined corrective action to be implemented. In particular, the engine control 154 determines whether the corrective action should be supplying commands that will vary the effective geometry of the engine to increase turbofan gas turbine engine rotational speed, or whether the corrective action should be supplying commands that will vary the effective geometry of the engine to decrease turbofan gas turbine engine rotational speed. This process, which was just described generally, is depicted in flowchart form in FIG. 2, and with reference thereto will now be described.

Figure 2:
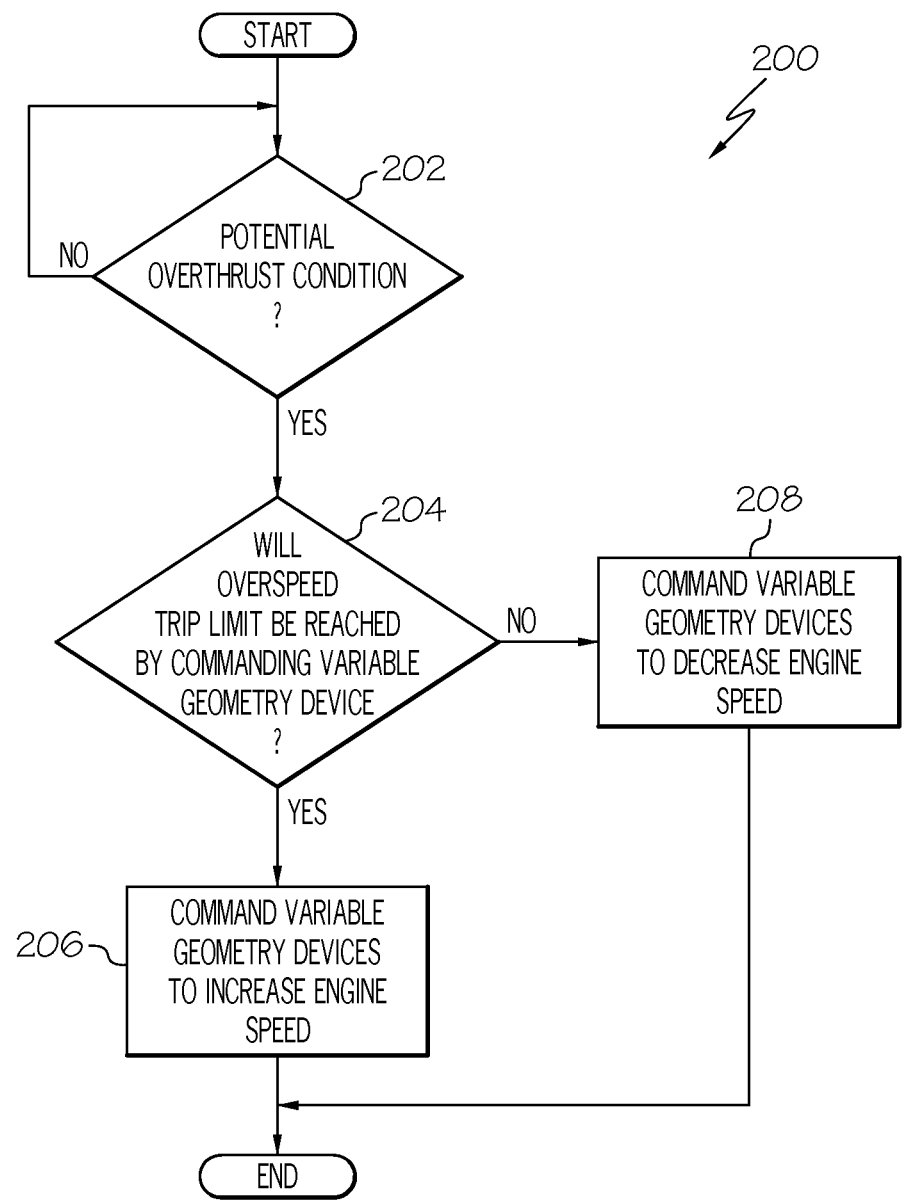
FIG. 2 depicts a process, in flowchart form, of accommodating an uncontrolled high thrust condition in a turbofan gas turbine engine, such as the one depicted in FIG. 1.

As FIG. 2 depicts, the engine control 154, upon initiation of the process 200, first determines whether the potential for an uncontrolled high thrust condition exists (202). If not, the process reinitiates. If, however, the potential does exist, the engine control 154 then determines if the turbofan gas turbine engine rotational speed will reach an overspeed trip limit by varying the effective geometry of the engine in a manner that will increase turbofan gas turbine engine rotational speed (204). In particular, based on the engine data, the engine control 154 determines whether the rotational speed of the high pressure turbine (N2) will reach an overspeed trip limit. As is generally known, the overspeed trip limit is a preset value that is stored in memory in the engine control 154.

If the engine control 154 does determine that the overspeed trip limit will be reached, the engine control 154 will then supply appropriate commands to the appropriate variable geometry devices that will increase turbofan gas turbine engine rotational speed (206). As a result, the turbofan gas turbine engine rotational speed will increase until it reaches the overspeed trip limit, and the engine 100 will shut down, thereby preventing the uncontrolled overthrust. If, however, the engine control 154 determines that the turbofan gas turbine engine rotational speed will not reach the overspeed trip limit, the engine control 154 will supply appropriate commands to the appropriate variable geometry devices that will decrease turbofan gas turbine engine rotational speed (208). As a result, the turbofan gas turbine engine rotational speed will decrease, and although the engine 100 will not automatically shut down, the uncontrolled overthrust is still prevented.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbofan gas turbine engine uncontrolled high thrust condition accommodation system, comprising:
    an engine data source configured to supply engine data representative of operability of a turbofan gas turbine engine; and
    an engine control coupled to receive the engine data and configured, upon receipt thereof, to determine when a potential for an uncontrolled high thrust condition exists in the turbofan gas turbine engine and, upon determining that the potential for the uncontrolled high thrust condition exists, to:
        determine whether or not a turbofan gas turbine engine rotational speed will reach an overspeed trip limit by varying a turbofan gas turbine engine effective geometry to increase the turbofan gas turbine engine rotational speed,
        supply commands that cause the turbofan gas turbine engine effective geometry to vary in a manner that increases the turbofan gas turbine engine rotational speed to the overspeed trip limit when it is determined that the turbofan gas turbine engine rotational speed will reach the overspeed trip limit, and
        supply commands that cause the turbofan gas turbine engine effective geometry to vary in a manner that decreases the turbofan gas turbine engine rotational speed when it is determined that the turbofan gas turbine engine rotational speed will not reach the overspeed trip limit.

2. The turbofan gas turbine engine uncontrolled high thrust condition accommodation system of claim 1, wherein the engine control is further configured, upon determining that the turbofan gas turbine engine rotational speed will reach the overspeed trip limit, to:
    supply commands that cause a plurality of inlet guide vanes to close, without changing a fuel flow to the turbofan gas turbine engine, to thereby increase the turbofan gas turbine engine rotational speed to the overspeed trip limit.

3. The turbofan gas turbine engine uncontrolled high thrust condition accommodation system of claim 2 wherein:
    the engine data include a high pressure turbine rotational speed; and
    the overspeed trip limit is associated with the high pressure turbine rotational speed.

4. The turbofan gas turbine engine uncontrolled high thrust condition accommodation system of claim 3, wherein the engine control is further configured, upon determining that the turbofan gas turbine engine rotational speed will not reach the overspeed trip limit, to supply commands that increase a bleed air flow from the turbofan gas turbine engine.

5. The turbofan gas turbine engine uncontrolled high thrust condition accommodation system of claim 4, wherein the commands that increase the bleed air flow from the turbofan gas turbine engine comprise one or more of:
    commands that increase the bleed air flow via one or more surge bleed control valves;
    commands that increase the bleed air flow via one or more aircraft bleed air system control valves; and
    commands that increase the bleed air flow via one or more engine anti-ice system control valves.

6. The turbofan gas turbine engine uncontrolled high thrust condition accommodation system of claim 1, wherein:
    the engine data include fuel metering valve data, the fuel metering valve data representative of operability of a fuel metering valve; and
    the engine control determines when the potential for the uncontrolled high thrust condition exists based, at least in part, on the fuel metering valve data.

7. The turbofan gas turbine engine uncontrolled high thrust condition accommodation system of claim 6, wherein the engine control is configured to process the fuel metering valve data to determine if the fuel metering valve is stuck.

8. A turbofan gas turbine engine control system, comprising:
    a turbofan gas turbine engine having a plurality of movable inlet guide vanes mounted therein, the plurality of movable inlet guide vanes responsive to guide vane position commands to move to commanded guide vane positions;

a plurality of bleed air flow control valves in fluid communication with the turbofan gas turbine engine, each of the plurality of bleed air flow control valves responsive to valve position commands to control a bleed air flow from the turbofan gas turbine engine;

an engine data source coupled to the turbofan gas turbine engine and configured to supply engine data representative of operability of the turbofan gas turbine engine; and an engine control coupled to receive the engine data and configured, upon receipt thereof, to determine when a potential for an uncontrolled high thrust condition exists in the turbofan gas turbine engine and, upon determining that the potential for the uncontrolled high thrust condition exists, to:

(i) determine whether or not a turbofan gas turbine engine rotational speed will reach an overspeed trip limit by varying a turbofan gas turbine engine effective geometry to increase the turbofan gas turbine engine rotational speed, (ii) supply guide vane position commands that cause the plurality of movable inlet guide vanes to close, without changing a fuel flow to the turbofan gas turbine engine, to thereby increase the turbofan gas turbine engine rotational speed to the overspeed trip limit when it is determined that the turbofan gas turbine engine rotational speed will reach the overspeed trip limit, and (iii) supply valve position commands that cause the bleed air flow from the turbofan gas turbine engine to increase, to thereby decrease the turbofan gas turbine engine rotational speed when it is determined that the turbofan gas turbine engine rotational speed will not reach the overspeed trip limit.

9. The turbofan gas turbine engine control system of claim 8, wherein:

the plurality of bleed air flow control valves include one or more of one or more surge bleed control valves, one or more aircraft bleed air system control valves, and one or more anti-ice system control valves; and the valve position commands that cause increased bleed air flow from the turbofan gas turbine engine are supplied to one or more of the one or more surge bleed control valves, the one or more aircraft bleed air system control valves, and the one or more anti-ice system control valves.

10. The turbofan gas turbine engine control system of claim 8, further comprising:

a fuel metering valve configured to control the fuel flow to the turbofan gas turbine engine, wherein:

the engine data include a fuel metering valve data, the fuel metering valve data representative of operability of the fuel metering valve, and the engine control determines when the potential for the uncontrolled high thrust condition exists based, at least in part, on the fuel metering valve data.

11. The turbofan gas turbine engine control system of claim 10, wherein the engine control is configured to process the fuel metering valve data to determine if the fuel metering valve is stuck.

* * * * *